United States Patent [19]

van Gasse

[11] 4,228,113

[45] Oct. 14, 1980

[54] PROCESS FOR MAKING OBJECTS FROM MINERAL FILLERS BONDED WITH A THERMOSETTING RESIN

[75] Inventor: Rene L. E. van Gasse, Opglabbeek, Belgium

[73] Assignee: Stamicarbon, B.V., Geleen, Netherlands

[21] Appl. No.: 956,042

[22] Filed: Oct. 31, 1978

[30] Foreign Application Priority Data

Nov. 3, 1977 [NL] Netherlands .................... 7712108
Dec. 28, 1977 [NL] Netherlands .................... 7714465

[51] Int. Cl.$^2$ .................... B29D 3/02; B29D 9/00
[52] U.S. Cl. .................... 264/24; 264/250; 264/255; 264/257
[58] Field of Search .................... 264/24, 255, 250, 257

[56] References Cited

U.S. PATENT DOCUMENTS

| Re. 28,068 | 7/1974 | Lemelson | 264/24 |
| 3,784,664 | 1/1974 | Nicklin | 264/255 |
| 4,123,488 | 10/1978 | Lawson | 264/255 |

FOREIGN PATENT DOCUMENTS 1406229 9/1975 United Kingdom .................... 264/255

*Primary Examiner*—Edward J. Smith
*Attorney, Agent, or Firm*—Cushman, Darby & Cushman

[57] ABSTRACT

Three-dimensional shaped objects are made by moulding a material, a moulding material consisting of mineral fillers and a thermosetting resin with a hardener being first evenly distributed outside the mould, the assembly (sheet) that has been prepared in this way and is still pliable being transferred to the mould and subsequently subjected to pressure at an elevated temperature, with the wall of the mould being provided, at the elevated temperature, with a layer of powdery, thermosetting resin with catalyst, which resin is made to melt and polymerize, after which the pretreated moulding material is installed in the mould and subjected to pressure. While the resin is melting, a fiber layer can be applied to it.

13 Claims, No Drawings

PROCESS FOR MAKING OBJECTS FROM MINERAL FILLERS BONDED WITH A THERMOSETTING RESIN

The invention relates to a process for making three-dimensionally shaped objects by moulding a material, in which a moulding material consisting of mineral fillers and a thermosetting resin with a hardener is first evenly distributed outside the mould, the assembly (sheet) that has been pretreated in this way and is still pliable is transferred to the mould and subsequently subjected to pressure at an elevated temperature.

The shaping of objects by hot moulding of a mixture of thermosetting resin and mineral fillers (so-called bulk, dough or sheet moulding compounds) is known. After moulding, the objects are further finished and, preferably while still warm, provided with a decorative layer. In the next moulding pass the mould is still hot. A relative process and moulding, as well as the finishing of such are described in Netherlands Patent Application No. 7,706,997, by which objects are made by causing unsaturated polyester resin, mineral filler and magnesium oxide to be mixed and to thicken in the presence of glass fibre to a moulding material that is virtually free of air and by moulding parts of the thickened material at an elevated temperature, after whicht the objects are given a finish outside the mould. This known method is cumbersome and therefore costly because much manual work is required to apply a sound and attractive finish.

Application of a finish to a three-dimensional object while this is being shaped in a mould is known. The objects concerned are however made from foam compounds. The finish applied to the mould wall, which finish is bonded to the object in the mould during moulding or shaping, is not then subjected to shearing forces by the moulding material and thus allowed to retain its integrity. In the case of a finish being applied in an analogous way to an object made from another material, e.g. wood, resin-bonded mineral substances, only flare or slightly curved shapes can be processed. In addition, with this process the hazard of damage to the finish by development of gas or vapour remains. To avoid this, extra provisions are then needed on the mould or in the practices performed on the moulding material, e.g. provision of vent ports.

The purpose of the invention is to apply to the face of a three-dimensional object to be shaped moulding, such as the aforementioned, a smooth, decorative and/or protective finish. Another purpose is to realize this finish by only a few cumbersome means during moulding, so that after moulding the object is completely finished.

According to the invention this is achieved if the wall of the mould is wholly or partly provided, at the elevated temperature, with at least one layer of a powdery, thermosetting resin with catalyst either with or without a pigment, which resin is made to melt and polymerize, whereupon the pretreated moulding material is placed in the mould and subjected to pressure.

By the procedures of the invention the envisaged purpose can be achieved by applying the finish in powdery form or in quasi-liquid form to the hot mould wall, powdery resin components and a liquid catalyst being mixed in a cylinder head and subsequently sprayed onto the mould wall. In both cases it is ensured that no components are present that boil or evaporate at the operating temperature. Rapid polymerization of the resin components applied to the mould wall is enhanced by the mould wall not cooling off significantly below the operating temperature after a moulding pass. The mould wall is also taken to mean the male mould if the decorative layer is to be applied on that side.

The essence of the invention is that, before introduction of the moulding material, the finish at least polymerizes to a thermoflexible state at the prevailing temperature, after which the moulding material is distributed evenly in the mould as a pliable assembly (preferably in the form of a sheet) and moulded. Any shearing forces still acting can be absorbed by the finish without damage.

It is still sometimes advisable to provide the pretreated, still pliable moulding material assembly on at least one side with a glass-fibre fleece before introducing this material as a sheet into the mould. This has several advantages: the pliable sheed is easier to handle, the eventually hardened material is strengthened on the outside, whilst, as an extra provision, any shearing forces still acting (on highly curved parts, for instance) are taken up.

The glass-fibre fleece that may be present on one or both sides of the material may or may not be pre-impregnated with resin and catalyst, but is preferably dry.

For moulding large areas, it may be necessary to apply substances to give air trapped between the mould wall and the pretreated pliable assembly an opportunity to escape during moulding. This is achieved by dusting on glass fibres while the layer or thermosetting resin applied to the wall of the mould is melting. Glass fibre in the form of a mat, fleece or fabric may also be laid on the polymerized resin layer before the moulding material is applied.

The powdery, thermosetting resin applied to the hot mould may consist of a polycondensation product of multivalent alcohols and multivalent, unsaturated acids or acid-forming anhydrides. Propylene glycol, ethylene glycol, pentane diol, butane diol, butylene glycol, dipropylene glycol are representatives of the alcohols. Among the acids and acid-forming anhydrides, maleic acid (anhydride), phthalic acid (anhydride), isophthalic acid (anhydride), adipinic acid and the like are usual. Normally, this unsaturated polyester resin is linked. Suitable for this purpose are unsaturated compounds, such as triallyl(iso)cyanurate, a prepolymer of polydiallylphthalate, and other dry monomers and prepolymers. As catalyst for this linkage the usual peroxides may be used, e.g. benzoyl peroxide in powder form. An internal release agent, e.g. zinc stearate, as well as an anti-blocking agent, is also taken up in the powdery resin. The preparation of a powdery, thermosetting resin is not restricted to unsaturated polyester resins. In an analogous manner, a powdery, thermosetting resin on the basis of epoxy resins can be applied successfully. However, other known moulding materials are not excluded hereby.

For pigment, preference is given to the use of coloured, inorganic substances, such as particles of metal oxide or metal. A decorative effect can also be achieved by replacing said pigments wholly or partly by particles of thermoplastics which are fully, partly or not soluble in one or more of the components of the thermosetting resin, as described in British Patent Specification 1,459,230.

By preference, two or even more layers are applied to the mould or parts thereof (including the male mould).

First a transparent layer is applied, next a second, pigmented one. In the finished product, the first layer then forms the outermost (transparent) layer.

Depending on the visible part, the mould and/or the male mould or parts thereof is/are provided with the thermosetting powder. Preferably, the powder is spread by dusting. This may take place in any suitable manner, preferably however by electrostatic dusting. Decorations may be applied to the finished product by covering certain parts during the dusting. It is advisable to apply two layers, of which the outermost layer of the finished product and, hence, the first layer to be dusted, is a transparent layer. With these two layers a true enamel effect is obtained.

By way of example, powdery mixtures of the following compositions (expressed in parts by weight) may be made by grinding.

| Component A: | 100 | resin | with zinc stearate and silicon dioxide |
|---|---|---|---|
| | 12.5 | triallyl cyanurate | |
| | 4 | tertiary butyl perbenzoate | |
| Component B: | 100 | resin | with zinc stearate and silicon dioxide |
| | 12.5 | triallyl cyanurate | |
| | 12.5 | prepolymer of diallyl phthalate | |
| Component C: | component B and pigment with silicon dioxide. | | |

For the first (transparant) layer a mixture of equal parts of components A and B is used; for the second, pigmented layer a mixture of equal parts of components A and C.

In this way, also other mixtures may be applied, for instance:

| Component D: | 100 | resin | with zinc stearate and silicon dioxide |
|---|---|---|---|
| | 25 | triallyl cyanurate | |
| | 25 | prepolymer of diallyl phthalate | |
| Component E: | 100 | resin | with zinc stearate and silicon dioxide |
| | 4 | tertiary butyl perbenzoate | |
| Component F: | component D and pigment with silicon dioxide. | | |

For the first (transparant) layer a mixture of equal parts of components D and E is used; for the second (pigmented) layer a mixture of equal parts of components E and F.

Yet another composition of the mixtures is as follows:

| Component G: | 100 | resin | with zinc stearate and silicon dioxide |
|---|---|---|---|
| | 15 | triallyl cyanurate | |
| | 15 | prepolymer of diallyl phthalate | |
| Component H: | 100 | resin | with zinc stearate and silicon dioxide |
| | 100 | powder/pigment | |
| Component K: | 100 | resin | with zinc stearate and silicon dioxide |
| | 20 | tertiairy butyl perbenzoate | |

For the first (transparant) layer a mixture of 100 parts of component G and 10 parts of component K is used; for the second (pigmented) layer a mixture of 100 parts of component G, 20 parts of component H, and 10 parts of component K.

The examples mentioned do not exclude other formulations, such as the use of other resins and of other monomers, prepolymers and polymers, precopolymers and copolymers.

For instance, the thermosetting powder may be obtained by grinding—together with a total of 30 parts by weight of triallyl cyanurate, 30 parts by weight of a prepolymer of polydiallylphthalate, 4.5 parts by weight of zinc stearate—240 parts by weight of the polycondensation product of 1.5 moles of hydrated bisphenol A, 1.5 moles of propylene glycol, 0.5 phthalic acid anhydride, 1 mole of maleic acid anhydride, 1 mole of fumaric acid anhydride, whereupon 6.75 parts by weight of benzoyl peroxide powder and 6 parts by weight of finely divided silicon dioxide (trade name Aerosil) are added.

The thermosetting powder may also be obtained as an epoxy resin by mixing 100 parts by weight of an unmodified condensation product of bisphenol A and epichlorohydrine with an equivalent quantity of hardener (amine, amide, acid anhydride), 2 parts by weight of zinc stearate for internal release agent. This mixture is heated at 130°–140° C. for a few minutes, to be rapidly cooled thereupon. The solidified mixture is pulverized to the powder to be dusted on.

All constituent, powdery resin components are preferably ground to a fineness lying between 30 and 80 microns, although other graduations may also be used. During the application of the mixtures the temperature of the mould and/or male mould should be approximately 90° to approximately 150° C. As a rule, this temperature is still present after the preceding moulding operation.

It is noted that the application of a coloured layer to an object by dusting with a powder is known, for instance from the Netherlands Patent Application No. 6,906,356. What is particular about the decoration according to the present invention was already described when setting forth the purpose aimed at.

An example of quasi-liquid components that may be atomized (again expressed in parts by weight):

| Component P: | 100 | resin | melted at 80 to 120° C., either with or without silicon dioxide or another thixotropy-effecting agent |
|---|---|---|---|
| | 12.5 | triallyl cyanurate | |
| | 12.5 | prepolymer of diallyl phthalate | |
| | 6 | zinc stearate | |
| Component Q: | 100 | component P | |
| | 100 | pigment | |
| Component R: | 3 | tertiary butyl perbenzoate | pre-mixed |
| | 3 | diallyl phthalate | |

For the first (transparant) layer a mixture of 100 parts of component P and 1 to 6 parts of component R is used; for the second (pigmented) layer a mixture of 100 parts of component Q and 1 to 6 parts of component R. The mixed components may be atomized with a special, if necessary heated, spray nozzle. As a rule, the constituent components are not mixed until they have entered the spray nozzle.

For moulding material, a material is highly suitable which, for instance, has been composed as follows:
A polycondensation product is started from of:
1.5 moles of hydrated bisphenol A,
1.5 moles of propylene glycol, 0.5 moles of phthalic acid anhydride,
1 mole of maleic acid anhydride,
1 mole of fumaric acid anhydride,
of which 650 parts are combined with:
235 parts by weight of styrene monomer,
100 parts by weight of diallyl phthalate,
10 parts by weight of tertiary butyl perbenzoate
5 parts by weight of water.
Finally, about 1 wt.% of magnesium oxide is added to this resin composition.

Next, starting from this resin mixture, a mixture, is composed which, referred to the total mass, contains 85 wt.% of calcium-magnesium carbonate of 0-200 microns, or another inorganic powder, such as calcium carbonate, silicon dioxide, talc and the like, and 1.5 wt.% of glass fibres having a length of, mainly, 6 to 9 mm. Of this self-levelling material a sheet is made—if desired between two glass fleeces—and allowed to thicken. The sheet, which has thus become pliable, is suitable to be placed in the pretreated mould. For that matter, the moulding material may already in a more pasty condition be placed on one or between two glass fleeces.

The finished products, particularly those in which glass fibre has been used, have a very good scratch resistance, which has been measured with the aid of the Erichsen apparatus, type 413, for the testing of hardness. As a measure of the scratch resistance weights are stated in grams at which a certain diamond penetrator does just not, and does just, bring about a scratch on the surface to be tested. In the case of stainless steel the load of the diamond penetrator is zero. For the finished products according to the invention 230-250. Further, the surface proved to be highly heat-resistant and resistant to household chemicals.

Objects made according to the process described can replace enamelled ceramic products very well, especially those for sanitary use, such as wash-basins, shower-basins, baths and the like, but also serve as kitchen slabs, drip trays for cooking-appliances, etc. Even highly complex shapes may be prepared in one pass. The thickness of the composed material may be very different, depending on the application. Thicknesses of between 5 and 15 mm are applied the most.

I claim:

1. In a process for moulding three-dimensionally shaped article from a molding material including the steps of
   (1) forming a pliable sheet of molding material composed of a thermosetting resin, a hardener of said thermosetting resin and mineral fillers;
   (2) transferring the thus formed sheet in a pliable condition to a mold; and
   (3) subjecting the sheet to pressure at an elevated temperature to form a three-dimensionally shaped article,
the improvement wherein prior to step (2)
   (a) at least a portion of the wall of the mold, under conditions of elevated temperature, is provided with at least one layer of a mixture of a powdery thermosetting resin and a catalyst for said resin,
   (b) the applied resin of step (a) is allowed to melt and is polymerized at said elevated temperature, and
   (c) the pliable sheet is inserted into the thus coated mold and subjected to pressure according to steps (2) and (3).

2. The process according to claim 1 wherein the molding material of step (1) that has been pretreated to form a pliable assembly is provided on at least one side with a glass fleece.

3. The process according to claim 1 wherein glass fibers are dusted onto the melting layer of thermosetting resin applied to the wall of the mold.

4. The process according to claim 1 or 2 wherein a layer of glass fiber in the form of a glass fiber mat, a glass fleece or a glass fiber is applied to the wall of the mold covered with the layer of thermosetting resin.

5. The process according to claim 1 wherein the powdery, thermosetting resin is an unsaturated polyester resin.

6. The process according to claim 5 wherein the powdery, thermosetting resin is a polycondensation product of a multivalent alcohol selected from the group consisting of propylene glycol, ethylene glycol, pentane diol, butane diol, butylene diol, dipropylene glycol, and a multivalent, unsaturated acid or acid-forming anhydride selected from the group consisting of maleic acid (anhydride), phthalic acid (anhydride), isophthalic acid (anhydride), adipinic acid, which resin is linked with unsaturated compounds consisting of triallyl(iso)cyanurate, a prepolymer of polydialkylphthalate, and other dry monomers or prepolymers, and said powdery resin contains a hardener as well as an internal release agent.

7. A process according to claim 1 wherein the powdery, thermosetting resin is an epoxy resin.

8. The process according to claim 5 or 7 wherein the powdery, thermosetting pigment resin contains particles of metal or metal oxide.

9. The process according to claim 1 wherein the powdery, thermosetting resin is dusted onto the mold wall by dusting.

10. The process according to claim 9 wherein the powdery, thermosetting resin is applied to the mold wall by electrostatic dusting.

11. The process according to claim 2 or 3 wherein the powdery, thermosetting resin and glass fibers are applied to only portions of the mold wall resulting in a decorative pattern in the molded product.

12. The process according to claim 1 or 5 wherein the powdery, thermosetting resin is obtained by grinding, together with 30 parts by weight of triallyl cyanurate, 30 parts by weight of a prepolymer of polydiallyl phthalate, 4.5 parts by weight of zinc stearate, 240 parts by weight of the polycondensation product of 1.5 moles of hydrated bisphenol A, 1.5 moles of propylene glycol, 0.5 mole of phthalic acid anhydride, 1 mole of maleic acid anhydride, 1 mole of fumaric acid anhydride, and thereafter 6.75 parts by weight of benzoyl peroxide powder and 6 parts by weight of finely divided silicon dioxide are added.

13. The process according to claim 1 or 7 wherein the powdery, thermosetting resin is obtained by heating together 100 parts by weight of an unmodified condensation product of bisphenol A and epichlorohydrine mixed with an equivalent amount of hardener and 2 parts by weight of zinc stearate at 130°-140° C., then cooling and pulverizing the resulting product.

* * * * *

UNITED STATES PATENT AND TRADEMARK OFFICE
CERTIFICATE OF CORRECTION

PATENT NO. : 4,228,113
DATED : October 14, 1980
INVENTOR(S) : Rene L.E. Van Gasse It is certified that error appears in the above-identified patent and that said Letters Patent are hereby corrected as shown below:

In claim 4, at patent column 6, line 13 (third line of claim), the word "fiber" should actually be the word "fabric".

Signed and Sealed this

Twenty-fourth Day of November 1981

[SEAL]

Attest:

GERALD J. MOSSINGHOFF

Attesting Officer

Commissioner of Patents and Trademarks

REEXAMINATION CERTIFICATE (492nd)

United States Patent [19]

van Gasse

[11] B1 4,228,113

[45] Certificate Issued Apr. 22, 1986

[54] PROCESS FOR MAKING OBJECTS FROM MINERAL FILLERS BONDED WITH A THERMOSETTING RESIN

[75] Inventor: Rene L. E. van Gasse, Opglabbeek, Belgium

[73] Assignee: Stamicarbon, B.V., Geleen, Netherlands

Reexamination Request:
No. 90/000,798, Jun. 13, 1985

Reexamination Certificate for:
Patent No.: 4,228,113
Issued: Oct. 14, 1980
Appl. No.: 956,042
Filed: Oct. 31, 1978

Certificate of Correction issued Nov. 24, 1981.

[30] Foreign Application Priority Data

Nov. 3, 1977 [NL]  Netherlands ................. 7712108
Dec. 28, 1977 [NL]  Netherlands ................. 7714465

[51] Int. Cl.[4] ........................................... B29D 3/02
[52] U.S. Cl. .............................. 264/24; 264/250; 264/255; 264/257

[56] References Cited

U.S. PATENT DOCUMENTS

| | | |
|---|---|---|
| Re. 28,068 | 7/1974 | Lemelson . |
| 3,504,063 | 3/1970 | Lemelson . |
| 3,770,690 | 11/1973 | Oswitch . |
| 3,793,049 | 2/1974 | Probst . |
| 3,812,074 | 1/1973 | Oswitch . |
| 3,848,045 | 8/1973 | Oswitch . |
| 3,917,790 | 1/1973 | Oswitch . |

FOREIGN PATENT DOCUMENTS

| | | |
|---|---|---|
| 856483 | 10/1974 | Japan . |
| 1420867 | 1/1976 | United Kingdom . |

OTHER PUBLICATIONS

*Encyclopedia of Polymer Science and Technology*, vol. 1, p. 788, (Interscience Publishers) Copyright 1964 John Wiley & Sons, Inc.
*Plastics Engineering Handbook*, pp. 477, 488 and 479, van Nostrand Reinhold Co., Copyright 1976.
*Fundamentals of Powder Coating*, pp. 220–223 and 228–233 incl., Copyright 1974, Society of Manufacturing Engineers.
U.S. PTO Board of Appeals decision in ex parte, Brueggeman, Appeal No. 614-43, 3/27/85.

*Primary Examiner*—Paul R. Michl

[57] ABSTRACT

Three-dimensional shaped objects are made by moulding a material, a moulding material consisting of mineral fillers and a thermosetting resin with a hardener being first evenly distributed outside the mould, the assembly (sheet) that has been prepared in this way and is still pliable being transferred to the mould and subsequently subjected to pressure at an elevated temperature, with the wall of the mould being provided, at the elevated temperature, with a layer of powdery, thermosetting resin with catalyst, which resin is made to melt and polymerize, after which the pretreated moulding material is installed in the mould and subjected to pressure. While the resin is melting, a fiber layer can be applied to it.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–13 is confirmed.

New claim 14 is added and determined to be patentable.

*14. In a process for molding three-dimensionally shaped articles from a molding material including the steps of:*
  *(1) forming a pliable sheet of molding material composed of a thermosetting resin, a hardener for said theremosetting resin and glass fibers;*
  *(2) transferring the thus formed sheet in a pliable condition to a mold; and*
  *(3) subjecting the sheet to pressure in the mold at an elevated temperature to form a three-dimensionally shaped article,*
  *the improvement wherein prior to step (2)*
    *(A) the wall of the mold, under conditions of elevated temperature, is provided with a coating of at least one layer of a mixture of powdery thermosetting resin and a catalyst for said resin, said resin being a polycondensation product of*
      *(a) a multi-valent alcohol selected from the group consisting of propylene glycol, ethylyne glycol, pentane diol, butane diol, butylene glycol, and dipropylene glycol, and*
      *(b) a multi-valent, unsaturated acid or acid-forming anhydride selected from the group consisting of maleic acid (anhydride), phthalic acid (anhydride), isophthalic acid (anhydride), adipinic acid,*
    *and which mixture further includes triallyl(iso)cyanurate and diallyl phthalate prepolymer;*
    *(B) the powdery thermosetting resin is allowed to melt on said mold wall and at least polymerize to a thermoflexible state at the temperature thereof; and*
    *(C) said pliable sheet is thereafter inserted into the thus-coated mold and subjected to pressure according to steps (2) and (3).*

* * * * *